United States Patent [19]

Bolshakov et al.

[11] Patent Number: 5,688,740

[45] Date of Patent: Nov. 18, 1997

[54] THREE-WAY CATALYST FOR TREATING EXHAUST GASES

[75] Inventors: Andriy M. Bolshakov, Moscow, Russian Federation; Seow Boon Quek, Singapore, Singapore

[73] Assignee: ARD Co., Pte. Ltd., Singapore, Singapore

[21] Appl. No.: 640,323

[22] Filed: Apr. 30, 1996

[51] Int. Cl.$^6$ .............................. B01J 23/74; B01J 23/40
[52] U.S. Cl. .................. 502/326; 502/327; 502/304; 423/213.5
[58] Field of Search ................................. 502/326, 327, 502/304; 423/213.5

[56] References Cited

U.S. PATENT DOCUMENTS

| | | | |
|---|---|---|---|
| 3,963,646 | 6/1976 | Teichner et al. | 252/459 |
| 4,171,288 | 10/1979 | Keith et al. | 252/462 |
| 4,552,732 | 11/1985 | Hillekamp | 423/210 |
| 4,552,733 | 11/1985 | Thompson et al. | 423/213.5 |
| 5,013,705 | 5/1991 | Koberstein | 502/262 |
| 5,021,389 | 6/1991 | Chattha et at. | 502/303 |
| 5,063,192 | 11/1991 | Murakami et al. | 502/303 |
| 5,130,109 | 7/1992 | Wan | 423/213.2 |
| 5,254,519 | 10/1993 | Wan et al. | 502/252 |
| 5,270,024 | 12/1993 | Kasahara | 423/213.2 |
| 5,338,715 | 8/1994 | Iida et al. | 502/64 |

*Primary Examiner*—Glenn A. Caldarola
*Assistant Examiner*—Bekir L. Yildirim
*Attorney, Agent, or Firm*—Oppedahl & Larson

[57] ABSTRACT

A three-way conversion catalyst useful for the treatment of exhaust gas streams to accomplish the catalytic oxidation of carbon monoxide and hydrocarbons and the catalytic reduction of the oxides of nitrogen has a catalyst carrier such as cordierite coated with an oxygen reservoir layer, and a second layer of finely divided nickel needles obtained by reduction of $Ni^{2+}$ in an autoclave and a platinum group metal.

18 Claims, 1 Drawing Sheet

THREE-WAY CATALYST FOR TREATING EXHAUST GASES

BACKGROUND OF THE INVENTION

This application relates to a three-way catalyst for the treatment of exhaust gases.

Three-way conversion (TWC) catalysts are capable of stimulating both the oxidation reactions for hydrocarbons and carbon monoxide (HC and CO) and also the reduction reaction of $NO_x$. Known three-way catalysts contain one or more platinum group metals, dispersed on a base (support) with a well-developed surface of stable oxides, usually $\gamma$-$Al_2O_3$ with the addition of oxides of Zr or Ce, together with one or more oxides of the alkaline-earth metals Ba, Ca and Sr. For example, see U.S. Pat. No. 4,171,288. The base is coated onto a carrier which can be a ceramic block (e.g. cordierite ceramic of Corning Inc.), or a spirally wound metal foil of Fe-Cr-Al or other corrosion-resisting materials on iron base.

In addition to platinum group metals, three-way catalysts are known which contain one or more oxides of d-elements (see U.S. Pat. No. 4,552,733), which can increase the efficiency of platinum group catalysts by maintaining oxygen availability through the convertible accumulation of oxygen during the current cycle and by suppressing generation of the toxic gases $H_2S$ and $NH_3$.

Commercially available three-way catalysts have two main disadvantages. First, they generally include several precious metals, i.e, Pt, Pd and Rh or sometimes Pt and Rh, which are costly and present serious technical problems for their recovery. Second, modern engines have higher exhaust gas temperatures. This accelerates thermal breakdown of the structure and composition of the catalytic surface, for example in the creation of aluminates, resulting in significant a decrease of catalytic efficiency over time.

U.S. Pat. No. 5,021,389 discloses a three-way catalyst. This catalyst has a four-layer structure formed from an alumina base, a discontinuous coating of lanthanum oxide disposed on the base, a discontinuous coating of palladium disposed cover the lanthanumoxide coated base, and a discontinuous coating of titanium dioxide disposed on over the palladium coated base. This structure is said to provide a synergistic enhancement of the catalytic effectiveness of the Pd, allowing greater efficiency through the use of a low cost material (titanium dioxide) which could at least in theory reduce the cost of the catalyst.

U.S. Pat. No. 5,013,705 discloses a three-way catalyst in which it is possible to use palladium instead of higher-priced platinum by including a high amount of cerium dioxide in the formulation.

The second disadvantage has been overcome to some extent by introducing in the substrate composition, thermostimulants such as zircon, alkaline earth metal oxides such as baria, calcia or strontia and/or rare earth metal oxides. See U.S. Pat. No. 4,171,288. In addition, formation of the catalyst in several layers may alleviate this problem, since thermal breakdown of one layer does not destroy the whole catalyst (See, for example, U.S. Pat. No. 5,063,192).

Notwithstanding the numerous improvement which have been made in the field of three-way conversion catalysts, however, there remains a continuing need for a lower cost catalyst which is stable at high temperatures. It is an object of the present invention to provide such a catalyst.

SUMMARY OF THE INVENTION

These and other objects of the invention are achieved by a catalyst comprising a catalyst carrier and first and second catalyst layers formed as discrete layers one over the other on the catalyst carrier with the first layer being formed between the catalyst carrier and the second layer. In the catalyst of the invention, the second layer comprises finely divided nickel needles having a specific surface area in excess of 100 $m^2/g$ onto which a platinum group metal is deposited. The first layer isolates the catalytic surface from the underlying support and provides an oxygen reservoir, and may advantageously comprise magnetite, cerium oxide and rhenium, and the second layer comprises nickel and a platinum group metal such as rhodium, palladium or preferably platinum. Thus, the invention provides a catalyst which need use only a single platinum group metal, in combination with relatively inexpensive other components.

DETAILED DESCRIPTION OF THE INVENTION

Figure 1:
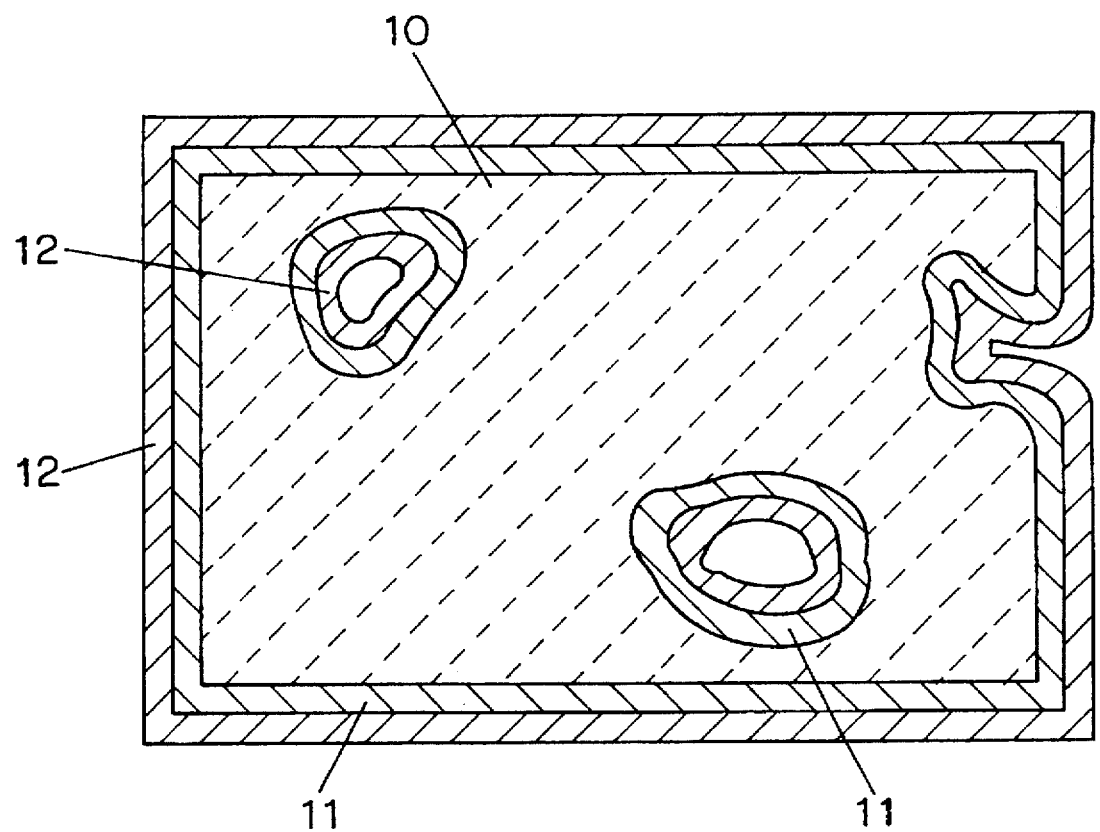
FIG. 1 shows a three-layer catalyst structure of the invention schematically.

FIG. 1 shows a catalyst in accordance with the present invention schematically. As shown, the catalyst comprises a catalyst carrier 10 and two catalytic layers 11 and 12.

The catalyst carrier 10 in accordance with the invention is advantageously cordierite, a refractory ceramic material.

The first catalytic layer 11 is applied on catalyst carrier 10. This layer isolates the carrier from the second catalytic layer 12 and provides an oxygen reservoir for the catalytic process. Many different compositions are known which can achieve these functions, and these compositions can be used in the present invention.

A preferred composition for the layer 11 comprises iron in the form of magnetite ($Fe_3O_4$), cerium in the form of cerium oxide ($CeO_2$), and rheniummetal. Each of these materials plays a functional catalytic role in provided effective an effective three-way catalyst.

Magnetite promotes the conversion of CO and, to a certain extent, $NO_x$. In addition, the magnetite helps to form a solid layer, isolating the components of the second layer 12 from the catalyst carrier 10.

Cerium oxide, as well as magnetite is an oxygen carrier that improves the oxidation of CO in rich air-fuel mixtures. Cerium oxide also serves to protect the catalyst from thermal degradation and affects the CO oxidation kinetics, particularly in the low temperature mode, by decreasing the of energy of activation.

The rhenium increases the effectiveness of Pt present in the second layer in the reduction of NO, particularly at temperatures above 500° C. Also, the use of rhenium instead of rhodium commonly used in prior art devices permits a significant reduction in the cost of materials.

Electron microscopy shows that the iron and cerium components of the first layer form a porous coating over the catalyst body. The rheniummetal is deposited in the pores.

The second catalytic layer 12 comprises catalytically active metallic nickel and a platinum group metal. When viewed by electron microscopy, the nickel in the second layer 12 in accordance with the invention is in the form of finely divided needles which are distributed uniformly all over the catalyst surface. The needles are from 0.3 to 1.2 µm, and more commonly 0.7 to 1.0 μm in length, and from about 0.1 to 0.3 μm thick. These needles provide a catalyst with a specific surface area which is much greater than previously known three-way catalysts. In particular, the specific surface area of the catalyst of the invention is at least 100 m²/g, more preferably at least 120 m²/g.

In a preferred embodiment, the first catalytic layer 11 is applied to the catalyst carrier 10 by first immersing the catalyst carrier 10 in a aqueous solution containing Fe $(NO_3)_3$, $Ce(NO_3)_3$ and $BaReO_4$. The catalyst carrier is immersed in the solution, and then dried. The dried carrier is then heated in a reducing atmosphere to convert the $Fe(NO_3)_3$ to magnetite and the $BaReO_4$ to metallic rhenium.

The second catalytic layer 12 is formed over the first catalytic layer 11 in two steps. First, the catalyst carrier 10 with the first catalytic layer 11 formed thereon is immersed in an aqueous solution of $NiCl_2$ and then dried. The wash coated block is then placed in an autoclave in a aqueous solution containing hydrazine, ammonia and optionally thiocarbamide and heated at a temperature of 90° to 100° C. for a period of 2 to 5 hours. The chemical metallization under pressure in an autoclave has two effects. First, it creates a layer having a thickness of about 120–150 μm with Ni content of 25%–40% (from ESCA data). Second, it leads to an accumulation of nickel on the surface by autocatalytic reduction of $Ni^{2+}$. The nickel is in the form of an advanced needle-like coating over the previous layer covering both the external surface of the catalyst carrier and the internal pores thereof. The specific surface area is considerably increased and is suitable for another layer capable of stimulating the conversion of CO, HC, and $NO_x$ in lean, stoichiometric and rich air-fuel mixtures in both low and high-temperature modes.

The partially completed catalyst is then washed with water, dried and coated with platinum. The platinum is applied by immersing the catalyst is a solution of $H_2PtCl_6$ in Trilon™, a chelating agent used for stabilizing platinum in solution, ammonia and hydrazine. This results in the formation of platinum-coated nickel needles which fully exploit the catalytic synergy of the nickel-platinum compound (permitting the use of minimum amounts of platinum) and further prevents the formation of nickel carbonyl which can easily be carried away in the exhaust gas resulting in deterioration of the catalyst. The number of active sites is also increased, thereby increasing the catalytic action. The specific surface area of the resulting catalyst is greater than 100 m²/g and can be as high as about 160 m²/g which is significantly greater than the specific surface area of $\gamma$-$Al_2O_3$ known in the prior art.

Useful catalysts in accordance with the present invention may include the various constituents over a range of amounts, reported here as weight percentages of the catalyst carrier, excluding the later applied coatings. For example, iron (in the form of magnetite) will generally be present in an amount from 1 to 6 percent; cerium (in the form of cerium oxide) in an amount of greater than 1 percent, preferably 2 to 6 percent; rhenium in an amount from 0.02 to 0.1 percent; nickel in an amount from 3 to 40 percent, and platinum in an amount of at least 0.3 percent. The specific combination of components employed can be selected to optimize certain properties of resulting catalyst.

For example, the amount of magnetite influences the conversion temperature for CO and NO as summarized in Table 1. Based on this information, iron amounts of 1 to 6% are suitable, and iron amounts of about 2 to 5% are preferred.

TABLE 1

Influence of Fe concentration on the conversion temperature of CO and NO. ($\lambda = 1$).

| Fe, wt % of the catalyst carrier | $T_{conv. NO}$ °C. | $T_{conv. CO}$ °C. |
|---|---|---|
| 1 | 400–500 | 380–500 |
| 2 | 320–400 | 320–400 |
| 3 | 200–250 | 200–250 |
| 5 | 250–300 | 250–300 |
| 6 | 390–450 | 350–400 |

The concentration of cerium oxide in the catalyst has a substantial effect on the conversion of CO. Thus, as shown in Table 2, increasing cerium oxide concentrations result in greater CO conversion. Preferably, the cerium level will be greater than 1% to achieve conversions of at least 50% of the CO, and more preferably at least 2%.

TABLE 2

Influence of Ce Concentration on CO Conversion

| Ce, % wt of the catalyst carrier | CO, conversion % |
|---|---|
| 0.5 | 48 |
| 1 | 55 |
| 2 | 70 |
| 3 | 75 |
| 4 | 85 |
| 5 | 81 |

The use of barium additive $BaReO_4$ appreciably increases activity of the system during the conversion of $NO_x$ and eliminates use of costly rhodium. Furthermore, as shown in Table 3, optimum NO conversion is obtained when the Re to Pt ratio exceeds a mole ratio of about 1:1. Preferred mole ratios are in the range of from 1:1 to 5:1.

TABLE 3

Influence or the Re/Pt ratio on the conversion efficiency of NO.

| Re/Pt mole ratio | NO, % conversion |
|---|---|
| 0:1 | 60.44 |
| 0.5:1 | 78.28 |
| 1:1 | 90.42 |
| 2:1 | 91.23 |
| 5:1 | 88.45 |

In forming the second layer, the amount of nickel also effects the CO conversion efficiency of the final catalyst. As shown in Table 4, increasing the amount of nickel results in increased CO conversion. Thus, the catalyst of the invention will preferably contain at least 10%, more preferably at least 25% nickel.

TABLE 4

Influence of Ni concentration on CO conversion

| Ni, % wt of block | CO, % conversion |
|---|---|
| 1 | 52 |
| 3 | 75 |
| 5 | 81 |
| 10 | 90 |

TABLE 4-continued

Influence of Ni concentration on CO conversion

| Ni, % wt of block | CO, % conversion |
|---|---|
| 15 | 94 |
| 25 | 99 |
| 30 | 99 |
| 40 | 99 |

The amount of nickel can be controlled by varying the duration of the heat treatment or by varying the amount of NiCl in the original solution. As shown in Table 5, application of an effective quantity of Ni can be achieved with heat treatments of about 2 to about 5 hours.

TABLE 5

Influence of the duration of heat treatment on Ni concentration on the surface of carrier.

| Time (hours) | Ni, % of catalyst carrier by weight |
|---|---|
| 0.5 | 2–4 |
| 1 | 13 |
| 2 | 35 |
| 3 | 30 |
| 4 | 37 |
| 5 | 40 |
| 6 | 40 |

A further factor in determining the amount of nickel in the catalyst is the temperature at which the heat treatment is conducted. As shown in Table 6, autocatalytic reduction reaction of $Ni^{2+}$ accelerates rapidly after 85° C.

TABLE 6

Influence of temperature reduction on $Ni^{2+}$ reduction (t = 4 hours)

| T °C. | $Ni_{met}$, % conversion to metal |
|---|---|
| 20 | 0 |
| 40 | 5 |
| 60 | 12 |
| 75 | 30 |
| 85 | 75 |
| 95 | 95 |
| 100 | 95 |

Example 1

A honeycombed carrier of cordierite (Corning) of 75 mm length was coated by immersion in 1 liter of an aqueous solution containing 45.38 g $Fe(NO_3)_3$, 40.75 g $Ce(NO_3)_3$ and 0.31 g $BaReO_4$. Subsequently it was dried at 120° C. and heated for two hours at 600° C. In order to obtain $Fe_3O_4$ and for the reduction of perrhenate to rhenium, the catalyst was heated in a reducing atmosphere of forming gas ($N_2$:$H_2$=90:10) for four hours at 550° C. to 600° C.

The dried carrier having the first layer applied was then immersed in an aqueous solution of $NiCl_2$ (25 g/l), dried for two hours at 120° C. and put into an autoclave, the inside surface of which is covered by a non-metallic material (for instance polyethylene, Teflon or other), in a 1-liter solution containing hydrazine (50 ml 70% $N_2H_4$, $H_2O$), ammonium (250 ml 25% $NH_4OH$) and thiocarbamide (1 g). The autoclave was hermetically sealed and slowly heated up to 90° C.–100° C. in one hour and then held at this temperature for five hours to convert the $Ni^{2+}$ to metallic nickel.

The autoclave treated carrier was then washed with water to remove residual $Ni^{2+}$ dried for two hours at 120° C. and then coated with platinum. The platinum coating is applied over a two hours period in a non-hermetic vessel at 50° C.–60° C. by immersing the nickel coated carrier in a solution (1 l) containing 10 ml of $H_2PtCl_6$ solution of 15 mg/ml concentration in water, 400 ml of 0.05M Trilon™, 300 ml of 25% $NH_4OH$, 40 ml of 5% $N_2H_4$.

The resulting catalyst had a composition of 3% iron (in the form of magnetite), 4% cerium (in the form of cerium oxide), 0.025% rhenium, 25% nickel and 0.030% platinum and was an effective three-way conversion catalyst for treatment of exhaust gases when tested for ability of removing CO, NOx and HC from exhaust gas with λ=1 and n (of the engine)=3400 $rev^{-1}$.

Example 2

To evaluate the necessity of the autoclave treatment to the formation of the nickel coating, two catalysts were prepared having approximately the same composition. One was prepared in the autoclave as described in example 1, and had a specific surface area of around 160 $m^2/g$. The other was prepared by saturating the carrier block with nickel solution, heating (but not autoclaving) and reducing the block under flowing hydrogen at 800° C. The comparison catalyst had a specific surface area of 60 to 80 $m^2/g$. As shown in Table 7, while the catalyst prepared without use of the autoclave had catalytic activity, the example prepared using the autoclave was far superior.

TABLE 7

Influence of a Ni coating mode on the conversion efficiency of the catalyst

| Ni- concentration, % | Coating method | % conversion | | |
|---|---|---|---|---|
| | | CO | HC | NO |
| 24 | without autoclave | 60 | 23 | 11 |
| 23.8 | in autoclave | 85 | 82 | 84 |

Example 3

The catalyst was prepared in the same manner as in Example 1, except that the amount of $Fe(NO_3)_3$ in the solution was 15.12 g. This resulted in a catalyst with an iron content of 1%.

Example 4

The catalyst was prepared in the same manner as in Example 1, except that the amount of $Fe(NO_3)_3$ in the solution was 30.2 g. This results in a catalyst with an iron content of 2%.

Example 5

The catalyst was prepared in the same manner as in Example 1, except that the amount of $Fe(NO_3)_3$ in the solution was 75.6 g. This results in a catalyst with an iron content of 5%.

Example 6

The catalyst was prepared in the same manner as in Example 1, except that the amount of $Fe(NO_3)_3$ in the solution was 121.0 g. This results in a catalyst with an iron content of 8%.

Example 7

The catalyst was prepared in the same manner as in Example 1, except that 5.1 g of $Ce(NO_3)_3$ was present in the solution. This resulted in a catalyst with a cerium content of 0.5%.

Example 8

The catalyst was prepared in the same manner as in Example 1, except that 10.2 g of $Ce(NO_3)_3$ was present in the solution. This resulted in a catalyst with a cerium content of 1%.

Example 9

The catalyst was prepared in the same manner as in Example 1, except that 10.4 g of $Ce(NO_3)_3$ was present in the solution. This resulted in a catalyst with a cerium content of 2%.

Example 10

The catalyst was prepared in the same manner as in Example 1, except that 15.5 g of $Ce(NO_3)_3$ was present in the solution. This resulted in a catalyst with a cerium content of 3%.

Example 11

The catalyst was prepared in the same manner as in Example 1, except that 25.9 g of $Ce(NO_3)_3$ was present in the solution. This resulted in a catalyst with a cerium content of 5%.

Example 12

The catalyst was prepared in the same manner as in Example 1, except that the barium perrhenate was omitted from the solution for forming the first layer.

Example 13

The catalyst was prepared in the same manner as in Example 1, except that the mole ratio of Re:Pt was adjusted to 0.5:1 by changing the amount of barium perrhenate used in forming the catalyst to 0.16 g.

Example 14

The catalyst was prepared in the same manner as in Example 1, except that the mole ratio of Re:Pt was adjusted to 2:1 by changing the amount of barium-perrhenate used in forming the catalyst to 0.62 g.

Example 15

The catalyst was prepared in the same manner as in Example 1, except that the mole ratio of Re:Pt was adjusted to 5:1 by changing the amount of barium perrhenate used in forming the catalyst to 1.55 g.

Example 16

The catalyst was prepared in the same manner as in Example 1, but the amount of NiCl in the solution was reduced to 1% to produce a catalyst having a nickel content of 1%.

Example 17

The catalyst was prepared in the same manner as in Example 1, but the amount of NiCl in the solution was reduced to 3% to produce a catalyst having a nickel content of 3%.

Example 18

The catalyst was prepared in the same manner as in Example 1, but the amount of NiCl in the solution was reduced to 5% to produce a catalyst having a nickel content of 5%.

Example 19

The catalyst was prepared in the same manner as in Example 1, but the amount of NiCl in the solution was reduced to 10% to produce a catalyst having a nickel content of 10%.

Example 20

The catalyst was prepared in the same manner as in Example 1, but the amount of NiCl in the solution was reduced to 15% to produce a catalyst having a nickel content of 15%.

Example 21

The catalyst was prepared in the same manner as in Example 1, but the amount of NiCl in the solution was reduced to 30% to produce a catalyst having a nickel content of 30%.

Example 22

The catalyst was prepared in the same manner as in Example 1, but the amount of NiCl in the solution was reduced to 40% to produce a catalyst having a nickel content of 40%.

What is claimed is:

1. A catalyst for purification of exhaust gases comprising a catalyst carrier and first and second catalyst layers formed as discrete layers one over the other on the catalyst carrier with the first layer being formed between the catalyst carrier and the second layer, wherein the first layer comprises a material effective to provide an oxygen reservoir during catalysis; and the second layer comprises nickel and a platinum group metal, wherein the nickel is present as finely divided needles distributed over the surface of the catalyst.

2. A catalyst according to claim 1, wherein the catalyst has a specific surface area of at least 100 $m^2/g$.

3. A catalyst according to claim 1, wherein the catalyst has a specific surface area of at least 120 $m^2/g$.

4. The catalyst as claimed in claim 1, wherein the noble metal in the second layer is platinum.

5. The catalyst as claimed in claim 1, wherein the first layer comprises iron in the form of magnetite, cerium in the form of cerium oxide and rhenium.

6. The catalyst as claimed in claim 5, wherein the iron is present in an amount from 1 to 6 percent by weight of the catalyst carrier; cerium in an amount of greater than 1 percent by weight of the catalyst carrier; and rhenium in an amount from 0.02 to 0.1 percent by weight of the catalyst carrier.

7. The catalyst as claimed in claim 1, wherein the second layer comprises nickel in an amount from 3 to 40 percent by weight of the catalyst carrier, and platinum in an amount of at least 0.3 percent by weight of the catalyst carrier.

8. The catalyst as claimed in claim 7, wherein the first layer comprises iron in the form of magnetite, cerium in the form of cerium oxide and rhenium.

9. The catalyst as claimed in claim 8, wherein the iron is present in an amount from 1 to 6 percent by weight of the catalyst carrier; cerium in an amount of greater than 1 percent by weight of the catalyst carrier; and rhenium in an amount from 0.02 to 0.1 percent by weight of the catalyst carrier.

10. The catalyst as claimed in claim 1, wherein first layer comprises iron in the form of magnetite in an amount of from 1% to 6% by weight of catalyst carrier.

11. A catalyst as claimed in claim 1, wherein the first layer comprises cerium in the form of cerium oxide in an amount of from 2% to 5% by weight based on the weight of the catalyst carrier.

12. The catalyst as claimed in claim 1, wherein the second layer comprises nickel in an amount of from 3% to 40% by weight of the catalyst carrier.

13. The catalyst as claimed in claim 1, wherein the catalyst comprises rhenium in the first layer, and wherein the rhenium and the platinum group metal are present in a mole ratio of 0.5:1 to 5:1.

14. The catalyst as claimed in claim 1, wherein the nickel needles are from 0.3 to 1.2 μm in length and from 0.1 to 0.3 μm in thickness.

15. A method for making a three-way conversion catalyst comprising the steps of:

(a) applying a first catalytic coating to a catalyst carrier to form a coated catalyst carrier, said first catalytic coating acting as an oxygen reservoir during catalysis;

(b) immersing the coated catalyst carrier in a solution containing $Ni^{2+}$ ions to form a Ni-wash-coated catalyst carrier;

(c) heating the Ni-wash-coated carrier in an autoclave to form a coating of nickel metal needles on the coated catalyst carrier; and (c) applying a coating of a platinum group metal over the nickel metal needles.

16. The method of claim 15, wherein the Ni-wash-coated catalyst is heated in an aqueous solution comprising hydrazine and ammonia to a temperature of 90°–100° C. for a period of 2 to 5 hours.

17. The method of claim 15, wherein the first catalytic coating is formed by the steps of immersing the catalyst carrier in a solution containing $Fe^{3+}$, $Ce^{3+}$, and a perrhenate;

drying the catalyst carrier; and reducing the dried catalyst carrier to form a catalyst carrier having a coating comprising magnetite, cerium oxide and rhenium.

18. A catalyst for purification of exhaust gases having an active catalyst surface formed from finely divided nickel needles with a specific surface area of 100 $m^2/g$.

* * * * *